A. BINNIE & E. H. E. C. McCARTHY.
HARNESS RELEASING APPARATUS.
APPLICATION FILED DEC. 30, 1909.
987,213.
Patented Mar. 21, 1911.
4 SHEETS—SHEET 3.
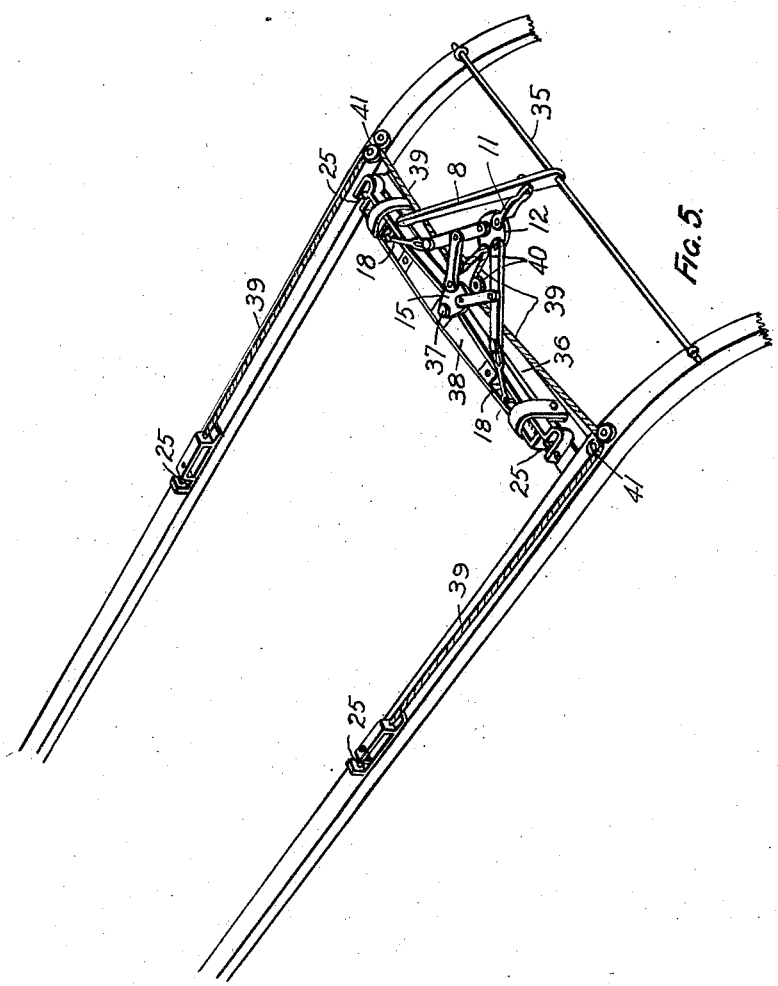

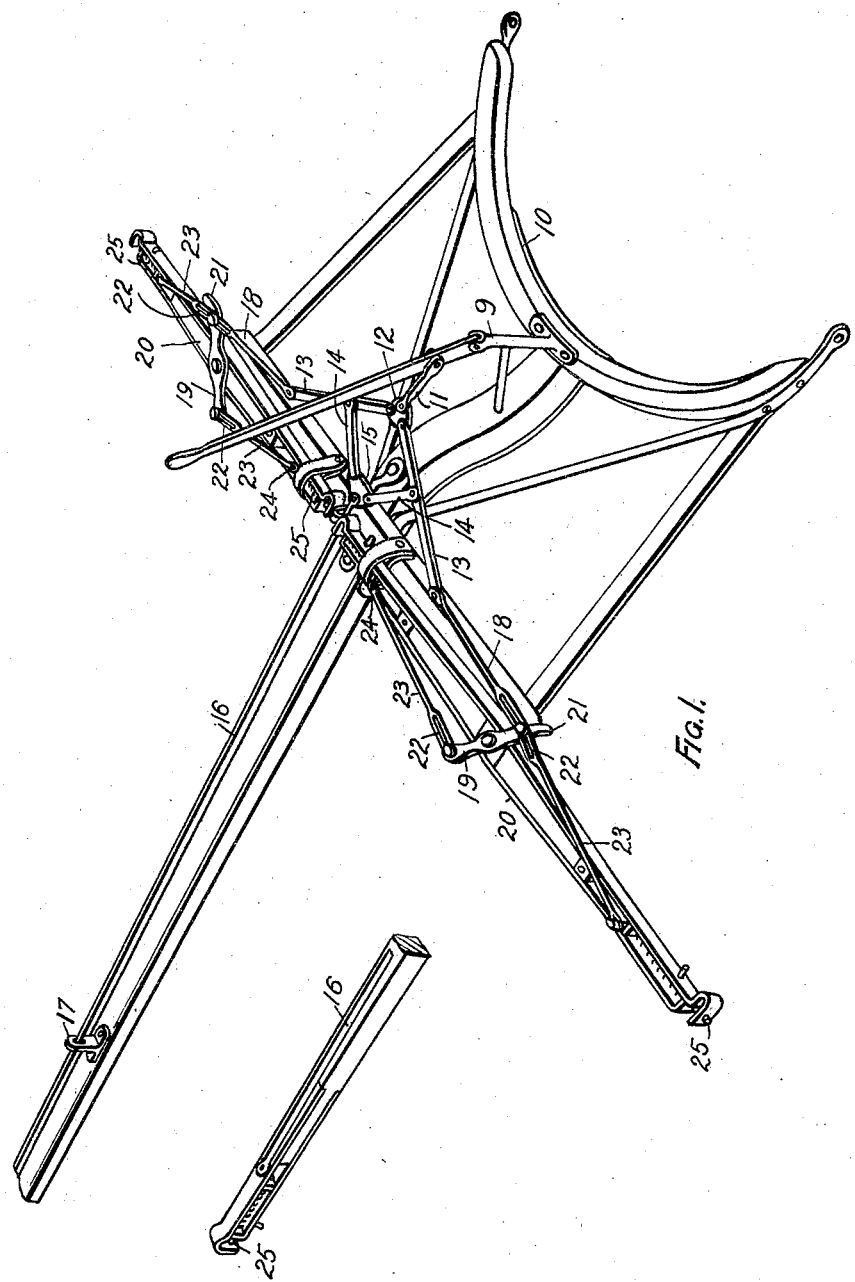

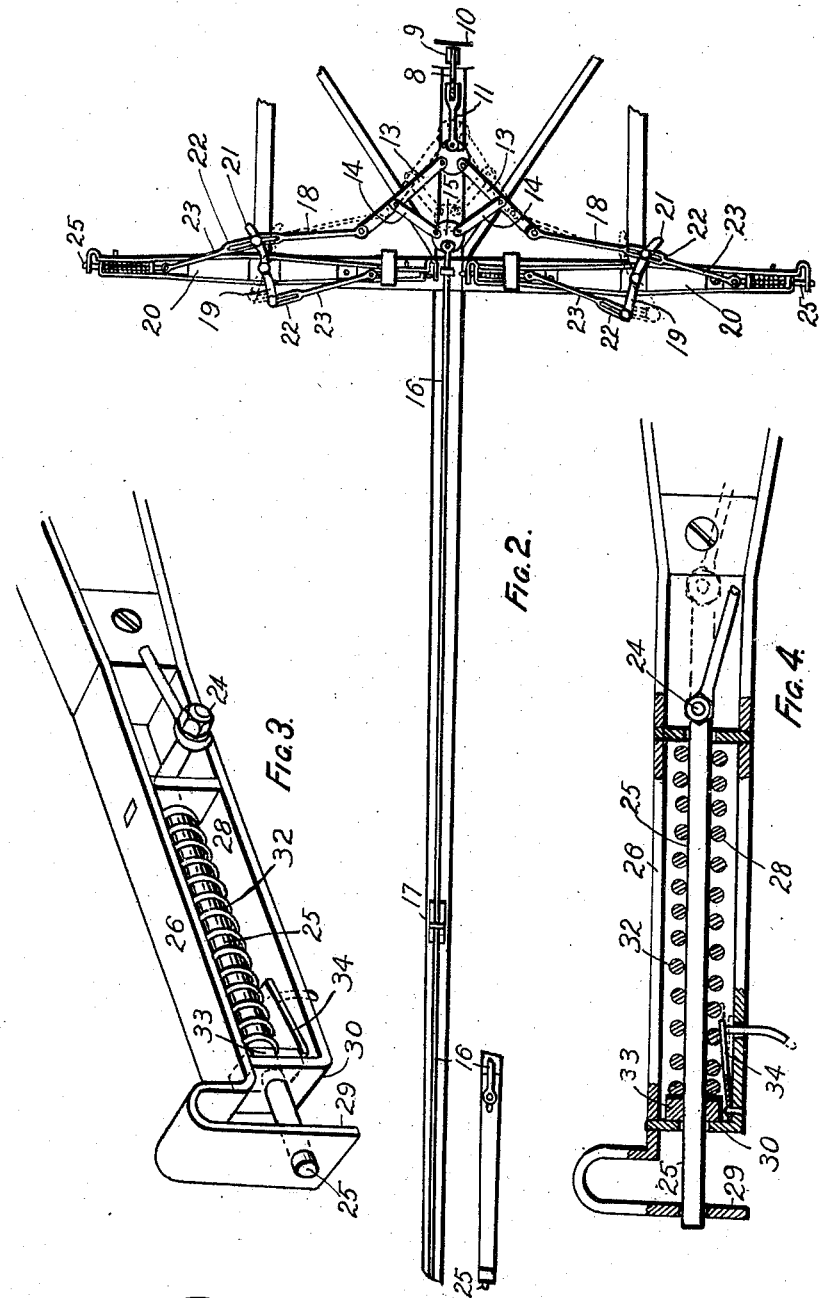

A. BINNIE & E. H. E. C. McCARTHY.
HARNESS RELEASING APPARATUS.
APPLICATION FILED DEC. 30, 1909.
987,213.
Patented Mar. 21, 1911.
4 SHEETS—SHEET 4.
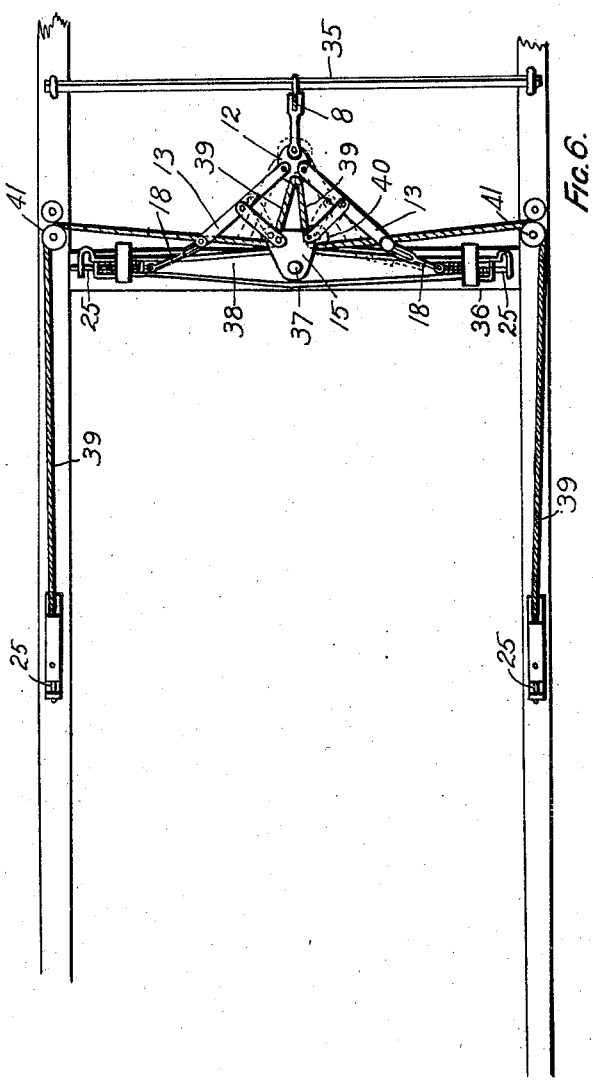
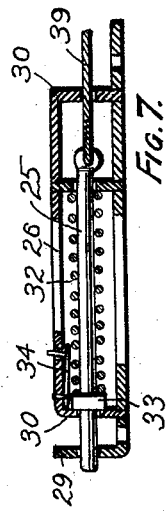

UNITED STATES PATENT OFFICE.

ALEXANDER BINNIE AND EUGENE HARROLD EWEN CRAIGIE McCARTHY, OF TOWAMBA, NEW SOUTH WALES, AUSTRALIA.

HARNESS-RELEASING APPARATUS.

987,213.  Specification of Letters Patent.  Patented Mar. 21, 1911.

Application filed December 30, 1909. Serial No. 535,627.

*To all whom it may concern:*

Be it known that we, ALEXANDER BINNIE, dairy-farmer, and EUGENE HARROLD EWEN CRAIGIE MCCARTHY, carpenter, both subjects of the King of Great Britain, and residing at Towamba, in the State of New South Wales and Commonwealth of Australia, have invented a new and useful Harness-Releasing Apparatus, of which the following is a specification.

This invention relates to devices whereby the traces and harness straps of draft animals may be quickly and easily attached and detached in ordinary use and whereby the releasing or freeing of harnessed animals in situations of stress through accident or otherwise may be instantly accomplished.

According to this invention the instant release of harnessed animals from vehicles either for convenience or in case of danger as may be incurred from such animals bolting, etc., is effected from a position in the vehicle by simply pulling a lever or cord which is attached to and actuates equalizing levers which levers take an equal strain at all points and are connected to the devices holding the harness to the vehicle. The holding devices comprise a spring bolt adapted to shoot across a keeper or socket and to be retained in retired position by a trigger. These holding devices are affixed at such positions on the vehicle where the harness is to be attached and eyes or loops on the harness ends take over the spring bolt in the keeper when it is retired and are held within said keeper by said spring bolt when advanced.

In order to illustrate the invention carried out practically the same will now be described with reference to the drawings accompanying and forming part of this complete specification.

Figure 1 is a perspective view and Fig. 2 a plan of the invention applied to a pole vehicle. Fig. 3 is a perspective view and Fig. 4 a sectional elevation of a holding device and Figs. 5 and 6 are respectively perspective view and plan of the invention applied to a vehicle with shafts and Fig. 7 is a sectional elevation of the slightly modified holding device for breeching straps.

In the construction of the embodiment of our invention, as illustrated in Fig. 1, the manually operable lever 8 is fulcrumed to the post 9 on the circle plate 10 attached to the pole and is connected by a rod 11 to the disk or plate 12. To this plate are pivoted the rear ends of two long toggle links 13. To the links at substantially central points thereof are pivoted the rear ends of the short toggle links 14. The adjacent or front ends of the short toggle links 14 are pivoted to the disk or plate 15. The forward or front ends of the long toggle links 13 are connected to the rod 18. This rod is provided with a slotted end which engages a pin carried by the lever 19 pivotally mounted between the swingle bars 20. The lever 19 is extended to form a handle for manual operation. To each end of said levers 19 are connected the slotted or looped ends 22 of connecting rods 23 whose other ends terminate in eyes which take over pins 24 on the rear end of the spring bolts 25 of the holding devices on the swingle bar ends each being retained in position by a screw nut.

The holding device forms the end of the swingle bars 20 or may be part of a frame for the same constructed of a light steel frame work 26 surrounding a wooden filling. The end of frame work 26 forms a box or housing 28 and a keeper 29. Within the housing 28 is the bolt 25 slidable in the ends 30 of the housing 28 and to and through the keeper 29. This bolt 25 carries a coiled spring 32 and a collar 33 to limit its outward travel and also to retain the bolt in retired position when it has been pulled back beyond the end of the spring trigger 34 riveted to one wall of the housing 28.

Connecting rods 23 allow for the individual release of the spring bolts 25 and the handle end 21 of the lever 19 provides for retiring the spring bolts 25 of the holding devices on the swingle bars 20 without the necessity of leaving the front.

In the modified construction of releasing devices applicable to a shaft vehicle the lever 8 is fulcrumed to a cross rod 35 on the shafts rearwardly of the cross bar 36 and is connected to the equalizing levers as before described. But in this case the disk 15 is anchored by the king bolt 37 through the swingle bar 38 to the cross bar 36 though as before they have three points of action. And in this case the disk 12 carries the center point of action wherefrom cords or wires 39 pass around sheaves 40 and 41 on the cross bar and shafts to the holding devices for the breeching straps. The two other points of action are the ends of levers 13 which are connected by rods 18 with looped or slotted ends to the inner ends of the spring bolts the holding device on the ends of the swingle bars for the traces as before described.

In use the lever 8 being pulled all the spring bolts 25 will be retired and will be held in that position by the triggers 34 without strain on the levers or mechanism. Each of the bolts 25 may be individually released by the triggers 34 as its part of the harness is put into position in the harnessing of animals to the vehicle. When it is desired to release the harness in order to free the draft animal the lever 8 is pulled and all the spring bolts 25 are simultaneously retired so that the harness is free and the animal may move clear of the vehicle.

It is obvious that various modifications may be made in the construction shown and above particularly described within the principle and scope of our invention.

We claim:

1. A harness releasing apparatus comprising two short toggle links with their front ends pivoted at adjacent points, two long toggle links pivoted to the rear ends of the short links at points between the ends of the long links, manually operable pulling means pivotally connected with the rear ends of the long toggle links, harness-engaging devices arranged to normally retain the ends of the harness, and connections between said devices and the front ends of the long toggle links.

2. A team-harness releasing apparatus comprising a holding device arranged to normally retain the neck-yoke at the end of the pole, a rod connected with said yoke holding device and arranged to disengage the same by a backward pull and said rod extending back along the pole, two short toggle links with a pivotal connection between their front ends and the said rod, two long toggle links pivoted to the rear ends of the short links at points between the ends of the long links, manually operable pulling means pivotally connected with the rear ends of the long toggle links, harness-engaging devices arranged to normally retain the ends of the harness, and connections between said devices and the front ends of the long toggle links.

In testimony whereof we have signed our names to this specification in the presence of two subscribing witnesses.

ALEXANDER BINNIE.
EUGENE HARROLD EWEN CRAIGIE McCARTHY.

Witnesses:
H. GILES SHAW,
D. McLEOD.

---

Copies of this patent may be obtained for five cents each, by addressing the "Commissioner of Patents, Washington, D. C."